United States Patent
Pregniard et al.

(10) Patent No.: US 10,183,695 B2
(45) Date of Patent: Jan. 22, 2019

(54) METHOD FOR CALCULATING, IN REAL TIME, THE ABSOLUTE POSITION OF A POWER STEERING MEMBER WITH IMPROVED ACCURACY

(71) Applicant: JTEKT EUROPE, Irigny (FR)

(72) Inventors: Romaric Pregniard, St Symphorien D'Ozon (FR); Loïc Bastien, Lyons (FR); Christophe Ravier, Saint Pierre de Chandieu (FR); Sébastien Bourdrez, Yzeron (FR)

(73) Assignee: JTEKT EUROPE, Irigny (FR)

( * ) Notice: Subject to any disclaimer, the term of this patent is extended or adjusted under 35 U.S.C. 154(b) by 260 days.

(21) Appl. No.: 14/917,918

(22) PCT Filed: Sep. 1, 2014

(86) PCT No.: PCT/FR2014/052152
§ 371 (c)(1),
(2) Date: Mar. 9, 2016

(87) PCT Pub. No.: WO2015/036675
PCT Pub. Date: Mar. 19, 2015

(65) Prior Publication Data
US 2016/0221605 A1    Aug. 4, 2016

(30) Foreign Application Priority Data
Sep. 10, 2013  (FR) ...................................... 13 58705

(51) Int. Cl.
*B62D 15/02* (2006.01)
*B62D 3/12* (2006.01)
*G01L 3/04* (2006.01)

(52) U.S. Cl.
CPC ........... *B62D 15/0235* (2013.01); *B62D 3/12* (2013.01); *B62D 15/021* (2013.01); *B62D 15/0245* (2013.01); *G01L 3/04* (2013.01)

(58) Field of Classification Search
CPC .............. B62D 15/021; B62D 15/0235; B62D 15/0245; B62D 3/12; B62D 5/0481; G01L 3/04
See application file for complete search history.

(56) References Cited

U.S. PATENT DOCUMENTS

| | | | |
|---|---|---|---|
| 6,889,794 B2 * | 5/2005 | Higashira ............ | B62D 5/0406 180/444 |
| 9,669,867 B2 * | 6/2017 | Hwa .................... | B62D 5/0457 |

(Continued)

FOREIGN PATENT DOCUMENTS

DE        102012002772 A1    8/2013

OTHER PUBLICATIONS

International Search Report dated Nov. 26, 2014 re: Application No. PCT/FR2014/052152; pp. 1-2; citing: DE 10 2012 002772 A1.

*Primary Examiner* — Freddie Kirkland, III
(74) *Attorney, Agent, or Firm* — Oliff PLC (57) ABSTRACT

The present invention concerns a method for determining the position of a movable steering member (1, 2, 3) belonging to a steering mechanism (4) of a vehicle that comprises at least a first movable member (1), such as a shaft (1) of an assistance motor (M), and a second movable member (2), such as a rack (2), which cooperate with each other by means of at least one first link (L1), said method comprising a step (a) that involves measuring the position (θ1) of the first member (1), then a step (b) that involves calculating the instantaneous position (θ2) of the second member (2) from said position of the first member (θ1), and a correction step (d) during which the calculation of the position (θ2) of the second member (2) is adapted, taking into consideration the (Continued)

offset ($\delta\theta\upsilon$) in the position of the second member (2) that results from the elastic deformation of the first link (L1) under the force (C1) transmitted by the latter.

12 Claims, 2 Drawing Sheets

(56) References Cited

U.S. PATENT DOCUMENTS 9,688,307 B2 * 6/2017 Kataoka ................ B62D 5/008
9,744,994 B2 * 8/2017 Fujita .................... B62D 5/049

* cited by examiner

METHOD FOR CALCULATING, IN REAL TIME, THE ABSOLUTE POSITION OF A POWER STEERING MEMBER WITH IMPROVED ACCURACY

TECHNICAL FIELD

The present invention concerns the general field of the power steering devices intended to equip motor vehicles, and more particularly that of the power steering devices comprising a steering wheel as well as an assist motor which allow transmitting a driving force to a steering rack, which is itself slidably mounted in a steering casing and connected to the steered wheels by steering rods.

BACKGROUND

For several years, we are witnessing in the automotive sector an increasing number and a generalization of the embedded electronic assistance systems designed to control the dynamic behavior of the vehicles, for safety purposes, such as path control (ESP) or braking (ABS) systems.

However, the correct operation of such control systems generally requires an accurate knowledge, in real time, of the orientation of the steered wheels of the vehicle.

For this purpose, it is known to measure, by using a suitable sensor, the instantaneous angular position of the shaft of the steering assist motor, then to deduce therefrom, knowing the gear reduction ratio of the reducer which connects the motor to the steering column, the angular position of the steering wheel, this angular position of the steering wheel being considered as representative of the position of the steering rack, and thus of the steering angle of the wheels.

However, the inventors have found that such evaluation method through calculation of the position of the steering members, and more particularly of the steering wheel, may be relatively inaccurate, according to the different life situations of the vehicle, the error of estimate (reported in equivalent rotation amplitude of the steering wheel) may reach in practice more than a dozen degrees.

By way of example, the inventors have in particular conducted the following experiment: they used, at the steering wheel of a steering mechanism, an angular position sensor whose accuracy was 1 (one) degree. Said steering wheel was driving a rack through a pinion, according to a pinion/rack connection which had a theoretical transmission ratio of 50 mm/revolution (the rack being supposed to be displaced linearly in translation by 50 mm when the pinion performs a full revolution). In view of this transmission ratio, and by considering the accuracy of the angular position sensor of the steering wheel, the absolute error of estimate of the linear position of the rack should have been in principle in the order of: 1 deg/(360 deg/revolution)*50 mm/revolution=0.14 mm.

However, the inventors have found that, in situations of intense steering, that is to say when a significant force was applied on the steering wheel (for example to simulate a clearing maneuver or a maneuver of leaving a parking position), said error of estimate of position of the rack, that is to say the deviation between the actual position (in translation) of the rack and the theoretical position of said rack calculated from the measured position of the steering wheel, could reach more than 1 mm, namely a value nearly seven times greater than the theoretically expected error.

In practice, on a new steering whose steering wheel is subjected to a high steering torque, in the order of 10 N.m, such error amounts to an angular deviation by ten degrees between the setpoint position given by the steering wheel and the effective position of the rack (expressed in the form of an angular position within the angular reference frame of the steering wheel).

It is then understood that such uncertainty does not enable guaranteeing optimal reliability and efficiency of the aforementioned path control or braking systems.

Furthermore, if possible, in absolute terms, to increase the accuracy of the measurement of the angular position of a member by the use of a dedicated sensor, located at the member whose position is desired to be known with accuracy, such solution represents in practice a significant additional cost, as well as an increase in mass and volume of the steering system, which runs counter to the intentions of lightening and reduction of costs constantly pursued by car manufacturers.

BRIEF SUMMARY

The invention aims to overcome the aforementioned drawbacks and to provide a new evaluation means of the position of a power steering member which has an increased accuracy and reliability, while being particularly simple and inexpensive to be implemented.

The invention provides a method for determining the position of a movable steering member belonging to a vehicle steering mechanism which comprises at least a first movable member, such as a shaft of a steering assist motor, as well as a second movable member, separate from the first one, such as a rack, which cooperate with each other through at least a first connection allowing a force and movement transmission between the first member and the second member, said method comprising a reference position acquisition step (a), during which the instantaneous position of the first member is measured relative to a predetermined origin, then a conversion step (b) during which the instantaneous position of the second member is calculated from the instantaneous position of the first member, said method being characterized in that it comprises a stress measuring step (c), during which a stress value representative of the instantaneous force transmitted between the first and the second members through the first connection is collected, then a correction step (d) during which the conversion step (b) is adapted depending on said stress value, in order to take into account, in calculating the position of the second member, a position shift of the second member relative to the first member which results from the elastic deformation of the first connection under the effect of the force transmitted by the latter.

Indeed, the inventors have discovered that the inaccuracy affecting the known position estimation methods mainly originates from the elastic nature (deformable under stress) of the mechanical connections between the movable steering members, such as meshing connections between pinion(s) and rack.

More particularly, the conventional approach taken so far implicitly considers, as a first approximation, that the connections between the steering members are kinematically ideal, and involve infinitely rigid members, so that the position of the second member, at the output of the connection, is the exact image of the position of the first member at the input of the connection, to the nearest transmission ratio (which is characterized by the geometry of the connection).

Indeed, the known methods ignore some factors nevertheless likely to influence, in some circumstances, the relative positioning of the steering members, and take particularly no account of the inherent flexibility to the connections (and to their constituent members), which is nevertheless likely to distort the calculations, in particular when the steering runs under high stresses.

Advantageously, the method in accordance with the invention therefore allows completing the aforementioned conventional approach by the addition, in calculating the position of the second member, of a correction, variable according to the level of force transmitted by the connection, in order to take into account the elastic nature of the actual connection and thus to include in said calculation the possible contribution of a deformation under stress of said connection (and, more particularly, members which constitute said connection).

Considering and quantifying the elastic deflection phenomenon of the connection and the concrete influence of this phenomenon on the positioning of the second member relative to the first member thus advantageously allows to calculate the effective position of said second member with an increased accuracy, since are known, on the one hand the position of the first member (and thus the geometric configuration in which the connection is located), and on the other hand the stress condition of the connection as well as the elastic behavior (the <<flexibility>>) of said connection, which allows associating a quantified deformation at the considered stress condition (such elastic behavior may be in particular characterized by means of an abacus obtained by a simulation or a test campaign).

More generally, it is remarkable that the method in accordance with the invention enables to accurately calculate, and without requiring any additional sensor, the position of any member belonging to the maneuver kinematic chain of the steering, at any point of said kinematic chain, and this, regardless of the number of successive connections that are in said kinematic chain, provided that are known firstly one (one is enough) reference position at a first point of said chain, secondly the kinematic characteristics (ideal theoretical transmission ratios) of the connection(s) of said chain, and thirdly, for each connection (or for all connections considered as a whole) comprised between the first point whose reference position is known and the second point whose position is desired to be calculated, the condition of the transmission stresses exerted on the connection (or all of the connections) and the <<flexibility>> of said connection (or all of the connections) in the form of a law or a characteristic curve of the elasticity of the connection (or all of the connections).

In a particularly advantageous manner, the method in accordance with the invention will allow in particular to calculate, at low cost and with high accuracy, typically with an absolute error lower than or equal to 1 (one) degree, the angular position of the steering wheel and/or the position of the rack (brought back by equivalence to an angular position in the reference frame of the steering column).

The low cost will be in particular related to the fact that the calculation may be performed from signals already present on the on-board electronic network of the vehicle, or even on the network of the steering system itself, such as the position of the shaft of the assist motor, the assist torque setpoint applied by said motor, and/or the steering wheel torque manually exerted by the driver.

Other characteristics and advantages of the invention will appear in further detail on reading the following description, as well as by using the appended drawings, provided for purely illustrative and non-limiting purposes, among which:

FIG. 6 illustrates, in a general view with partial enlargement, the respective positions of different members of the steering mechanism of FIG. 1, in this case the positions of the shaft of the assist motor, of the rack and of the second pinion located on the driver's side, during a steering cycle, so as to comparatively let appear (by using a standardized scaling relative to the angle of the steering wheel), on the one hand the calculated positions of the rack and of the second pinion, evaluated according to the method in accordance with the invention from a measurement of the angular position of the shaft of the assist motor, and on the other hand the effective positions of these same steering members, measured on a test bench under the same stress conditions, the proximity of the calculated curves and the measured curves enable appreciating the high accuracy and the excellent reliability of the calculation method in accordance with the invention.

The invention concerns a method for determining the position, and more particularly the absolute position of a movable steering member 1, 2, 3 belonging to a vehicle steering mechanism 4 which comprises at least a first movable member 1, such as a shaft 1 of a steering assist motor M, as well as a second movable member 2, separate from the first one 1, such as a rack 2, which cooperate with each other through at least one first connection L1 allowing a force C1 and movement transmission between the first member 1 and the second member 2.

The steering mechanism 4 will preferably comprise a steering wheel 3, through which the driver can act, and more particularly manually exert a steering wheel torque $C_V$, on a steering column 5 which engages the rack 2, in order to displace said rack 2 in translation (along a direction denoted Y in FIG. 1, which preferably corresponds substantially to the longitudinal axis of said rack, and preferably to the transverse steering of the vehicle) in a steering casing secured to the chassis of the vehicle.

For description convenience, a mark formed by a direct trihedron whose longitudinal horizontal direction (rear-front of the vehicle) is denoted X, the transverse horizontal direction (lateral right-left) is denoted Y, and the vertical direction is denoted Z, is associated to the steering mechanism 4, and more generally to the vehicle.

The displacement, that is to say the position change of the rack 2 (along the direction Y) causes, through the steering rods 6, 7, a modification of the yaw orientation (steering angle $\alpha_8$, $\alpha_9$, about the axis Z) of the left 8 and the right 9 steered wheels.

Figure 1:
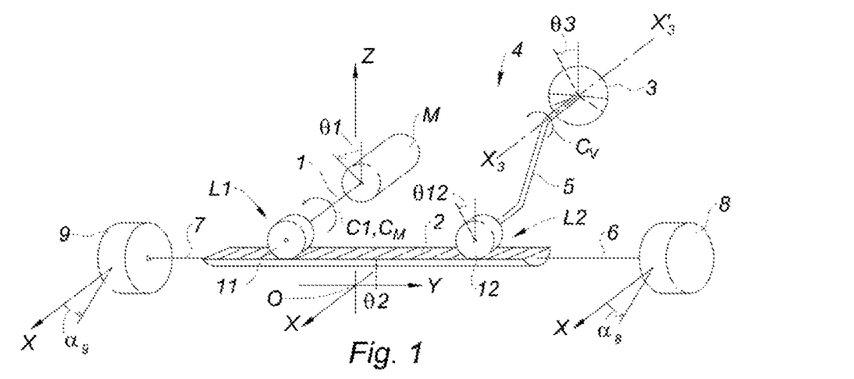
FIG. 1 illustrates an example of double-pinion power steering mechanism to which a method in accordance with the invention may be applied.

Preferably, as illustrated in FIG. 1, the steering mechanism 4 forms a power steering mechanism comprising at least one preferably electric assist motor M, and preferably with two directions of operation, which allows providing, according to predetermined assist laws, an assist torque to the maneuver of the steering, said assist torque being called <<motor torque>> $C_M$.

By way of example, this motor torque $C_M$ will be able to amplify the steering wheel torque $C_V$ in order to facilitate the steering of the wheels or even to help returning the steering wheel 3 to the central position at the exit of the turn.

According to a preferred variant, the steering mechanism 4 will be able to form a double-pinion mechanism, as illustrated in FIG. 1.

Such double-pinion mechanism comprises first of all, on a kinematic chain portion forming an <<assist section>>, an assist motor M whose shaft 1 forms the first movable member and engages, through a first connection L1 including a first pinion 11, on a steering rack 2 which is slidably mounted in a steering casing and which forms the second movable member.

Said double-pinion mechanism also comprises, on a kinematic chain portion (remote and separate from the preceding one) forming a <<manual section>>, a steering wheel 3, which forms a third movable member and which engages the rack 2 by a second connection L2 comprising a second pinion 12 (which is in this case fastened to the end of the steering column opposite the end receiving the steering wheel 3).

That being so, the method in accordance with the invention is quite applicable on other variants of steering arrangement, since it is desired to know (calculate) the position of a movable member from the knowledge of the position of another member belonging to the same kinematic chain.

Thus, the steering mechanism 4 could alternatively form a simple-pinion mechanism comprising an assist motor M which would directly engage the steering column 5, for example through a reducer with worm wheel and worm screw, between the steering wheel 3 and the pinion 12 (only this time) which allows said column 5 to mesh with the rack 2.

For simple convenience of description, reference will be made in what follows, for preferential but non limiting purposes, to the steering members described in the foregoing, and more particularly, to the double-pinion arrangement.

Figure 2:
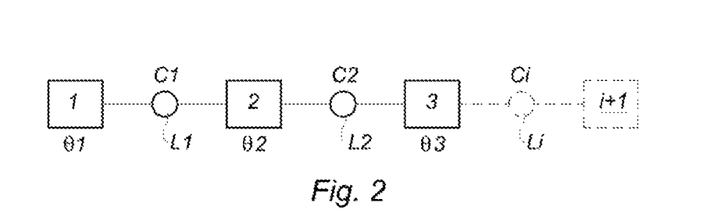
FIG. 2 illustrates, in a schematic view, the decomposition principle, in a succession of members and connections, of a kinematic chain of steering mechanism, for implementing a method in accordance with the invention.

In any event, as illustrated in FIG. 2, the succession of movable steering members 1, 2, 3, i+1 and of the connection(s) L1, L2, Li . . . (i representing a integer) allowing said members 1, 2, 3 to interact with each other by hinging (in series) relative to each other and to be displaced along separate paths defined by the kinematic nature of said connections L1, L2, Li, will form a kinematic chain of the steering mechanism 4, allowing ultimately the modification of the steering angle $\alpha_8$, $\alpha_9$ of the steered elements (steered wheels 8, 9) of the vehicle.

The concerned connection(s) L1, L2, Li will of course be arranged to allow a mechanical power transmission from the input member (for example the first member 1 for the connection L1) to their output member (for example the second member 2 for the connection L1) which will be sufficient to allow the input member to drive in displacement the output member in order to modify the steering angle of the steered wheels 8, 9 and/or to maintain said steering angle in particular against the stresses exerted by the roadway on said wheels.

Of course, the connection(s) L1, L2, Li will be able to take any suitable form for the coupling of two successive members 1, 2, 3 for the force transmission C1, C2, Ci and the desired movement conversion.

The connection(s) L1, L2, Li will be advantageously bidirectional, that is to say will allow a steering movement to the left as well as to the right.

In a particularly preferred manner, said connection(s) L1, L2, Li will be reversible, that is to say the input member will be able to drive in displacement the output member and, conversely, the output member will be able to drive in displacement the input member. As such, said connections will be able for example to form gears, connecting rod assemblies or even connections by reversible ball screws.

According to a preferred variant, the second member is formed by a steering rack 2 slidably mounted in a steering casing, and on which the first member 1 meshes with a pinion 11.

It will be noted that the choice of determining by calculation, according to the method in accordance with the invention, the position of the rack 2, allows obtaining a particularly accurate and reliable evaluation of the yaw angle (steering angle) of the steered wheels 8, 9, to the extent that said rack 2 is particularly close to said wheels 8, 9 in the steering kinematic chain (since it is separated therefrom only by the connecting rods 6, 7 controlling the yaw rotation of the stub axles).

The efficiency of the safety systems, and in particular of the path control systems (ESP), which use this steering angle information $\alpha_8$, $\alpha_9$, will therefore be increased.

According to the invention, the method comprises a reference position acquisition step (a), during which the instantaneous position $\theta 1$ of the first member 1 is measured relative to a predetermined origin.

More preferably, the first member 1 being formed by the shaft 1 of a steering assist motor M, the instantaneous angular position $\theta 1$ of said shaft 1 of the assist motor, will be measured during the reference position acquisition step (a), preferably by means of a position sensor integrated to said motor M.

Advantageously, the use of an angular position sensor which is already present within the assist motor, as it is generally the case on all the synchronous electric motors, allows saving a dedicated additional sensor, and using directly, for the purposes of the calculation according to the method in accordance with the invention, a position $\theta 1$ information which is already directly available at the motor M, and more generally on the on-board network (Controller Area Network) of the vehicle.

The implementation of the method therefore advantageously causes no increase in volume or in weight of the steering system.

It will be noted that, for convenience of description (and for simplification of the use of the method), all the values $\theta 1$, $\theta 2$, $\theta 3$, $\theta 12$ ( . . . ) representative of a steering member position 1, 2, 3, 12 ( . . . ), and in particular of the angular position $\theta 1$ of the drive shaft, of the longitudinal position $\theta 2$ of the rack, the angular position $\theta 12$ of the second pinion 12 or the angular position $\theta 3$ of the steering wheel 3, will be preferably expressed as <<equivalent angular positions>>, in a common (unique) mark, said mark being preferably attached, conventionally, to the physical rotation axis $(X_3 X_3')$ of the steering wheel 3.

Where appropriate, the conversion between the actual absolute position of a steering member 1, 2, 12, expressed for example in the mark X, Y, Z attached to the vehicle, and the equivalent angular position of a same steering member 1, 2, 12 in the mark attached to the axis of the steering wheel 3, will be able to be performed by multiplying said absolute position (physical) of the concerned member by the inverse of the transmission ratios (and in particular the reduction or amplification ratios) which geometrically characterize the connection or the succession of connections L1, L2, Li, which separate the considered member 1, 2, 12 of the steering wheel 3.

The <<transmission (ratio) $R_{L1}$, $R_{L2}$>> (or <<conversion ratio>>) is related to the geometry of the considered connection L1, L2, and defines the kinematic characteristics of the movement of the output member (herein the second member 2 for the connection L1), and in particular the amplitude (position) or the speed of said movement, depending on the characteristics (amplitude, speed) of the movement of the input member (the first member 1 for this same connection L1).

This transmission ratio $R_{L1}$, $R_{L2}$ may typically correspond to the gear ratio (in reduction or amplification) in the case of a gear connection, to the axial increment step by screw angle unit in a ball screw connection, or even to the lever corresponding to the pitch radius of the pinion 12 in the case of a pinion 12/rack 2 connection, etc.

Thus, for example, the linear (absolute) position of the rack, that is to say the linear displacement (generally expressed in millimeters) of said rack relative to the central position O of the steering, will be able to be converted into the equivalent angular position θ2 by multiplying said linear displacement by the inverse of the gear ratio (movement conversion ratio) of the second connection L2, that is to say, typically, by the inverse of the pitch radius of the pinion 12.

In a particularly preferred manner, the equivalent angular positions of the movable members will be further able to be <<standardized>>, that is to say related to the scale of the stroke of the member (herein preferably the steering wheel 3) which is chosen to define the common mark.

In other words, the respective displacement of each steering member will be able to be expressed in the form of the equivalent rotation amplitude of the steering wheel 3, which rotation amplitude of the steering wheel is necessary to control the considered displacement of said member.

In practice, the standardization of the positions of the steering members, and more particularly the standardization of the equivalent angular positions of the latter, will be able to be carried out by performing the quotient of the instantaneous position of the considered member 1, 2, 12 (measured or calculated) by the total stroke of said considered member, then by multiplying this quotient by the corresponding total angular stroke of the steering wheel 3.

By way of example, if we consider that, to switch the rack 2 from its central position (the steered wheels 8, 9 being lined up in the longitudinal axis of the vehicle) to its maximum steering position to the left (the wheels 8, 9 being oriented to the maximum possible to the left of the vehicle), it is necessary to displace in translation said rack by a total stroke $y_{2MAX}$ mm, by turning for this purpose the steering wheel 3 to the left by a $\theta3_{MAX}$ degrees angle (total angular stroke), then the standardized angular position θ2 of the rack 2, corresponding to any displacement by $y_2$ mm of said rack to the left, will be given by:

$$\theta2 = y_2/y_{2MAX} * \theta3_{MAX}.$$

It will be noted that such <>standardized>> mode of expression finally considers that (fictitiously, to simplify the representation and the management of the steering mechanism 4) if the connections L1, L2, Li were perfect, and in particular infinitely rigid (and without clearance), their respective transmission ratios $R_{L1}$, $R_{L2}$, $R_{Li}$, would be in fact unitary ($R_{Li}=1$), so that, in particular, the standardized equivalent angular position θ2 of the second member 2 (or any other member of the considered kinematic chain) would be equal to the standardized equivalent angular position θ1 of the first member 1.

Furthermore, in all cases, that is to say regardless of the mode of expression (actual absolute position, equivalent angular position, or equivalent standardized angular position) retained to express the positions of the members, the origin of the mark, relative to which said positions of the movable members are quantified, will preferably correspond to the central position O (neutral position) of the steering (and more particularly at the central position of the steering wheel 3), when the wheels 8, 9 are pointed straight ahead, that is to say oriented according to the zero steering angles: $\alpha_8 = \alpha_9 = \theta$.

According to the invention, the method comprises, subsequently to the reference position acquisition step (a), a conversion step (b) during which the instantaneous position θ2 of the second member 2 is calculated from the instantaneous position θ1 of the first member (and, where appropriate, from the transmission ratio $R_{L1}$ of the first connection L1).

According to the invention, the method also comprises a stress measuring step (c), during which a stress value C1 representative of the instantaneous force C1 transmitted between the first member 1 and the second member 2 through the first connection L1 is collected, then a correction step (d) during which the conversion step (b) is adapted depending on said stress value C1, in order to take into account, in the calculation of the position θ2 of the second member 2, a position shift $\delta\theta_{L1}$ of the second member 2 relative to the first member 1 which results from the elastic deformation of the first connection L1 under the effect of the force C1 transmitted by the latter.

For convenience, as well as the positions of the steering members are expressed in the form of angular positions in a same reference mark attached to the axis ($X_3X_3'$) of the steering wheel 3, the forces C1, C2, Ci . . . , transmitted respectively through the connections L1, L2, Li, will be expressed in the form of equivalent driving torques about said reference axis ($X_3X_3'$).

Furthermore, for purposes of brevity and convenience of notation, the stress value representative of the force will be assimilated to the force C1, C2, Ci itself.

The stress value(s) C1, C2, Ci required for the calculation may be obtained by any suitable means, and in particular by one or more torque sensor(s) placed on the shaft 1 of the assist motor M, on the steering column 5 near the steering wheel 3, etc., or by any relevant evaluation (calculation) carried out from available data on the on-board network.

Advantageously, the method in accordance with the invention allows determining in real time, by a relatively simple calculation, the position of any (second) member 2 of the steering kinematic chain with a high accuracy, by taking into account simply, on the one hand the position of a (first) reference member 1, and on the other hand the consequences of the actual intrinsic elasticity of the kinematic chain intermediate section which separates the first member 1 from the second member 2, elasticity which is related to the nature of the constituent material of the different elements of said intermediate section, to their shape and to their sizes, and which contributes, due to the deformation of said section under stress, to create an additional deflection effect (shift) relative to the theoretical position of the considered member that would have been observed if the connections had been ideal.

Of course, the calculation principle provided by the invention may be reiterated and extended, step by step, connection after connection, over the entire length of the concerned kinematic chain, regardless of the number of the members and the constituent connections of said chain, so as to be able to determine, by calculation with very high accuracy, the position of any member 2, 3, i+1 of the chain, even very remote from the member 1 (where appropriate, of the only member) the reference position of which is exactly known by a measurement.

Furthermore, it may be advantageously possible, in absolute terms, to choose indifferently as a reference, that is to say, as starting point for the calculation, any member of the kinematic chain whose position may be easily measured, as soon as will be available (kinematic and elastic) characteristics of the different connections successively crossed and a knowledge of the corresponding stress conditions allowing to perform a position reset (correction) step by step from this reference member and until the member-target whose position is ultimately desired to be calculated.

Thus, it may be possible to consider for example that the reference position is known by a measurement of the angular position of the steering wheel 3, or even of the longitudinal linear position of the rack 2.

In a particularly preferred manner, during the correction step (d), a correction component $\delta\theta_{L1}$ representative of a position shift $\delta\theta_{L1}$ corresponding to the elastic deformation of said first connection L1 under said stress value C1 is associated with the stress value C1, according to a predetermined elasticity abacus $A_{L1}$ (FIG. 4), which may also be referred to as <<flexibility curve>>, and which is representative of the elastic behavior of the first connection L1.

Herein again, by convenience of notation, the correction component $\delta\theta_{L1}$ will be assimilated to the position shift it represents.

The mode of expression of the position shift $\delta\theta_{L1}$, and therefore of the corresponding correction component $\delta\theta_{L1}$ will be preferably homogeneous to the mode of expression retained to express the calculated position of the target member, to which this correction is applied, said shift may thus be expressed as the case may be either in the <<actual>> form (in the mark attached to the vehicle), or, preferably, in the form of an equivalent angular shift (in the mark attached to the axis of the steering wheel 3) or, in a particularly preferred manner, in the form of a standardized angular shift (reported to the scale of the stroke of the steering wheel 3).

It will be furthermore noted that the principle of calculation of the position shift is of course applicable mutatis mutandis when crossing each one of the other connections in the studied kinematic chain.

Figure 3:
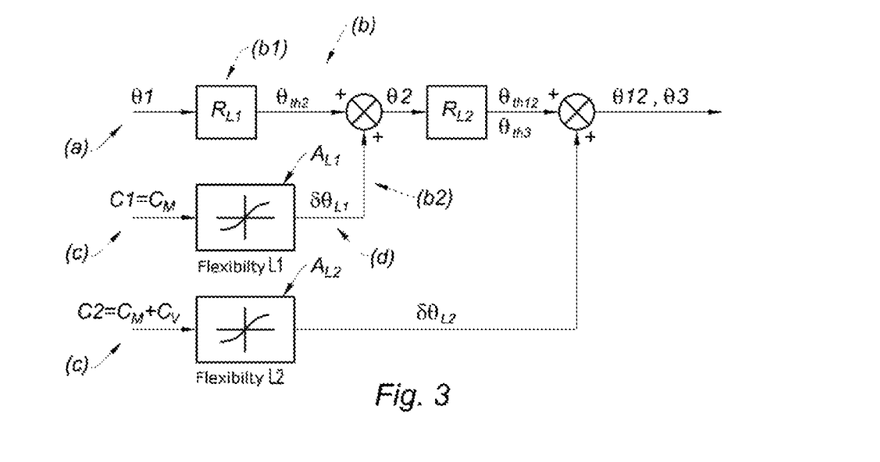
FIG. 3 illustrates, in a functional block diagram, an example of the implementation principle of the calculation of the positions of steering members, with preferential reference to the kinematic chain of FIG. 2 applied to the mechanism of FIG. 1.

Thus, as it may be seen in particular in FIG. 3, said second connection L2 being subjected to a transmission force C2, a correction component $\delta\theta_{L2}$ representative of a position shift $\delta\theta_{L2}$ (between the third member 3, 12 and the second member 2) which corresponds to the elastic deformation of said second connection L2 under the stress value C2, may be associated to the crossing of a second connection L2 between the second member 2 and a third steering member (for example the second pinion 12 or the steering wheel 3), and this, due to a (second) predetermined elasticity abacus $A_{L2}$ (FIG. 5), representative of the elastic behavior of the second connection L2.

It is remarkable that the general principle of the invention comprising characterizing, herein by means of an elasticity abacus, the elasticity of a section (whatever it is) of a kinematic chain of a steering, said section extending between a first point of said chain and a second point of said chain remote from the first one (and preferably belonging to a steering member forming a solid separate from that to which the first point belongs), so as to be able to calculate the effective position, and more particularly the angular position, of said second point from the knowledge, on the one hand of the (measured) position of the first point, and on the other (if applicable) of the characteristic of the (ideal) kinematic connection between the first and the second points, and finally the stress condition, and more particularly of the torsion torque, that undergoes said section, is applicable regardless of the length and the nature of the concerned section, and in particular regardless of the number of separate members and connection(s) constituting said section, since there is an abacus characterizing said section to evaluate the associated correction, related to the position shift under stress (relative to the theoretical position related to a fictitiously ideal kinematic).

In this regard, it will be noted that it is possible to arbitrarily divide the kinematic chain of the steering mechanism 4 in as many sections as desired, and to characterize each section of this plurality of sections by its own elasticity abacus.

The <<length>> of each section, and more particularly the number of member(s) and connection(s) joined together in the same section, will be in particular able to be chosen according to various criteria, such as the selection of the "strategic" member(s) whose position needs to be calculated, the sensitivity of said members or connections to the elastic deformation under the force transmission, and/or according to the (more or less fine) resolution desired to be provided in order to characterize the behavior of the kinematic chain.

Thus, by way of example, if the kinematic chain is subdivided into a succession of short sections (according to a "fine grid"), each section containing only a connection L1 (and the two movable members 1, 2 immediately juxtaposed which engage each other to form said connection), the respective positions of the members of each section may be determined, step by step, with a high accuracy at any point of the kinematic chain, thereby allowing to provide very complete information on the condition of the steering chain.

Conversely, a grouping of several connections within the same section (coarser grid) will only allow determining the positions of some members (among all constituent members of the chain) which would have been previously selected for their strategic nature, but by advantageously using less (force) sensors, less storage resources (for the abaci) and less calculation power.

Regardless of the fineness of the used grid, will be assigned to the concerned section an elasticity abacus $A_{L1}$, $A_{L2}$, $A_{Li}$ associating a position shift $\delta\theta_{L1}$, $\delta\theta_{L2}$, $\delta\theta_{Li}$ (by elastic deformation) to a stress condition C1, C2, Ci of said section, and more particularly expressing an (equivalent) angular deformation under a torsion force (equivalent).

In this regard, it will be advantageously noted that, the extension of the <<length>> of a section (that is to say the increasing of the number and/or dimensions of the members and the connections which constitute it) does not deteriorate, in practice, the accuracy of the calculation of the position of an end member of said section (output member) from the position of the opposite end member of this same section (input member), as soon as an abacus which effectively characterizes the behavior of said section as a whole, from the input member to the output member, is established.

The necessary abacus/abaci may be built or modeled beforehand by any suitable means, and for example empirically by a campaign of tests carried out on the actual steering mechanism 4, or by a numerical simulation (of the finite elements calculation kind).

Said abaci, or <<maps>>, may for example be stored in the form of curves (scatter diagrams) in a non-volatile memory of the steering calculator.

In order to limit the required storage space, said generally nonlinear curves may in particular be simplified and based on the knowledge of a limited number of points (for example ten points), where appropriate interpolated, for example linearly piecewise or by a suitable polynomial function.

Figure 4:
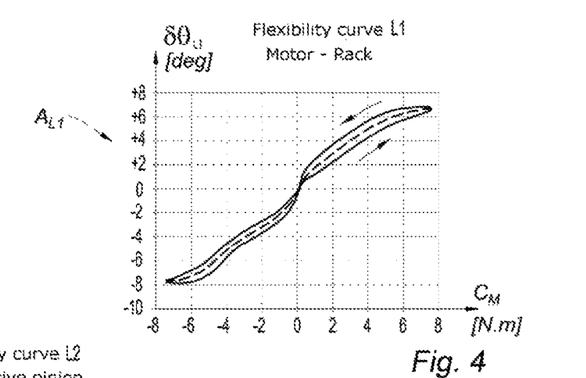
FIG. 4 illustrates an example of an elasticity abacus (called <<first flexibility curve>>) characteristic of the elastic deformation under stress of the mechanism of FIG. 1 at a first connection (herein, between the assist motor and the rack, through a first pinion).
Figure 5:
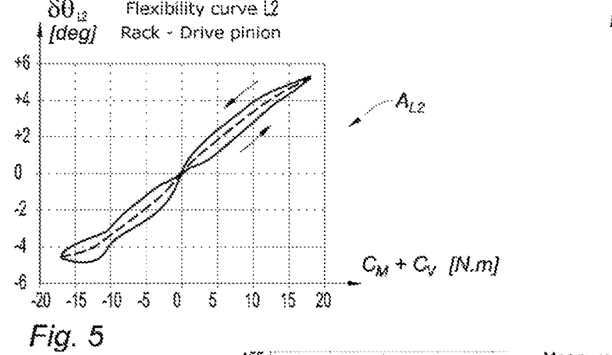
FIG. 5 illustrates another example of elasticity abacus (called <<second flexibility curve>>) characteristic of the elastic deformation under stress of the mechanism of FIG. 1 at a second connection (herein between the rack and a second pinion secured to the steering column which bears the steering wheel).

Furthermore, the inventors have empirically found that the elastic behavior of the studied connection(s) L1, L2, of the abaci, generally exhibited a hysteresis phenomenon, as it can be seen in FIGS. 4 and 5.

In this case, the travel direction of the hysteresis cycles is counterclockwise, as indicated by the arrows on said Figures.

As a first approximation, it is however possible to consider, for the calculation of the position shifts, the average elastic behavior which corresponds to the average curve of half hysteresis, passing through the midpoints of the cycles, said average curve being represented by a plot in dashed lines in FIGS. 4 and 5.

Figure 6:
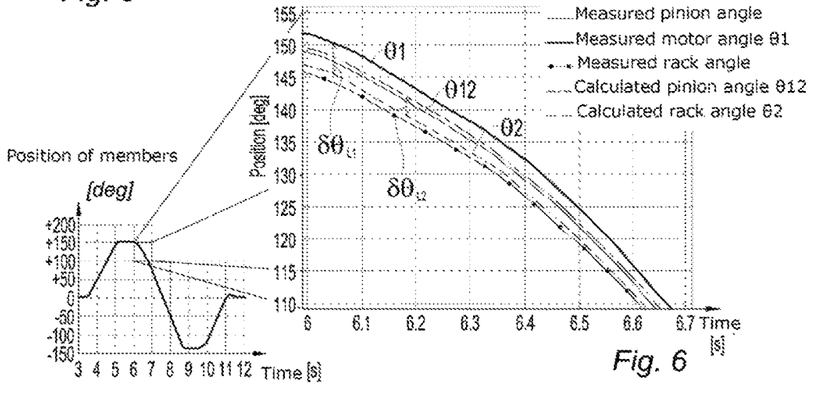

In practice, the tests show, as it is seen in FIG. 6, that the reached accuracy, that is to say, the maximum error recorded between the calculated position values and the actual position values, as verified by test bench measuring (values called "measured" values on said FIG. 6) herein for the positions θ2 of the rack and θ12 of second pinion (driver's side), is then lower than or equal to 1 (one) degree, even for significant steering amplitudes, corresponding herein to a drive shaft 1 angle variation θ1 equivalent to +/−150 degrees of steering wheel rotation amplitude 3.

As an indication, the forces implemented during these tests, which correspond to the usual life situations of a motor vehicle steering, were in the order of 3 N.m for the steering wheel torque $C_V$, from 4 to 8 N.m for the motor torque $C_M$ output by the assist motor, which results in tensile forces on the rack 2 able to reach about 14 kN.

That being so, according to a possible variant of implementation which may constitute a full-fledged invention, it is perfectly possible, in order to take into account the hysteresis phenomenon associated with the elastic deformation of one or more section(s) of the steering kinematic chain, and more particularly of one or more connection(s) L1, L2, to consider, during the correction step (d), behavior laws (in particular of the first connection L1) in elastic deformation under stress which will be different depending on whether the stress value C1, C2 increases (that is to say increases in absolute value) over time or on the contrary decreases over time.

In this case, the hysteresis has herein the consequence that the magnitude of the position offset is (or remains) more significant, with initially equal stress value, in "descent" phase of said stress C1, C2 (that is to say, when the magnitude of the stress is being decreased and goes to zero), than the "rise" phase of said stress C1, C2 (that is to say when the magnitude of said stress is being increased and gets away from zero).

Such distinction between ascending phase (stress increase phase) and descending phase (stress reduction phase) will advantageously allow obtaining an increased estimation accuracy of the position shift related to the elastic deformation, and consequently the calculation of the position of the concerned member(s) 2, 3, 12.

The selection of the ascending or descending model may be performed from the knowledge of the progression direction of the stress value C1, C2, progression direction which can itself be determined by calculating the first time derivative, that is to say, by the sign of the variation (difference) between two stress values C1(t1), C1 (t2) successively measured over time (for two distinct instants t1 then t2).

Where appropriate, a low-pass filter upstream of the derivative calculation may be provided, in order to prevent noise to distort the evaluation of the progression direction of the stress value C1, C2.

Preferably, as illustrated in FIG. 3, the conversion step (b) comprises a theoretical conversion sub-step (b1), during which a theoretical position component θth2 of the second member 2 is calculated by multiplying the position θ1 of the first member 1 by the theoretical transmission ratio $R_{L1}$ of the first connection L1, fictitiously considered as non-deformable, then a resetting sub-step (b2) during which the correction component $\delta\theta_{L1}$ resulting from the correction step (d) is added to the theoretical position component θth2 of the second member in order to obtain the effective position θ2 of the second member 2.

In other words, as it particularly seen in FIGS. 3 and 6, in order to perform the calculation, it is preferably considered that the effective position θ2 of an output member 2 (preferably expressed as the equivalent absolute angular position, standardized where appropriate) is the sum (algebraic, by taking into account the signs) of a first component corresponding to the theoretical position θth2 in which would be located said output member 2 if the connection L1 with the input member 1 was ideal and infinitely rigid, and of a second component $\delta\theta_{L1}$ corresponding to the position shift induced by the elastic deformation under stress C1 of the connection L1.

Of course, if the effective absolute position θ2 of the output member 2 is standardized, that is to say, expressed as the equivalent angular position in a common mark, attached to another movable member, such as the steering wheel 3, the transmission ratio $R_{L1}$ may be avoided when calculating the theoretical position (which means considering a unitary transmission ratio), so that said theoretical position of the output member 2 is (in principle) equal to the measured position of the input member 1: θth2=θ1.

Ultimately, according to this simplified approach, the method allows thus to estimate (calculate), in real time, the effective position of the second member 2, by simply applying (algebraically adding) to the measured position θ1 of the first member 1, the correction component $\delta\theta_{L1}$ (also standardized, that is to say, expressed as an equivalent angular deflection in the common mark) which is associated with the elastic deformation of the connection L1 under the stress value C1.

Of course, more generally by reiterating to each connection i (respectively to each section of the kinematic chain), the measurement of the stress value Ci and the determination (preferably according to the elasticity abacus $A_{Li}$) of the corresponding position shift $\delta\theta_{L1}$ induced by elastic deformation, it is possible to accurately determine, and at every instant, the position of the remote member i+1, by adding to the measured position θ1 of the first member serving as reference, the algebraic sum of the shifts: $\theta_{i+1}=\theta 1+\Sigma_{j=1}^{i}\cdot\delta\theta_{Lj}$ It should be noted in this regard that, for convenience of description, FIG. 3 uses only symbols <<+>> to indicate these operations of algebraic sum, regardless of the intrinsic (positive or negative) sign of the angular positions and the considered shifts.

Of course, in practice, in particular according to the sign of the stresses applied to the constituent members of the connections, and then along the direction of the deformations resulting from these stresses, the <<algebraic sum>> may amount either to subtract, or on the contrary to add, the value of the correction component to the value of the angular position.

For example, in conventional use of the steering system, the steering wheel 3 (therefore the second pinion 12) and the assist motor M (and therefore the drive shaft 1) (actively) drive the rack 2 and are then generally "in advance" relative to said rack.

In other words, the elastic deformation of the corresponding connection(s) results, in such cases, in that the maneuvered member 2 remains back from the theoretical position that the maneuvering member 1, 12 commands it to reach.

Thus, and as illustrated in FIG. 6, the elasticity of the connection L1 between the drive shaft 1 and the rack 2 having the effect of "delaying" the (induced) displacement of the rack 2 relative to the (motor) displacement of the shaft 1, the magnitude of the displacement of the rack 2, and consequently its position θ2, is lower, from the (absolute) value of the correction $\delta\theta_{L1}$, than the magnitude of the corresponding displacement of the drive shaft 1.

According to this example, it may be particularly observed that, for a position θ1 of drive shaft 1 close to +152 degrees (expressed in a standardized way in the reference frame of the steering wheel 3), the rack reaches "only" about +146 degrees, the algebraic correction $\delta\theta_{L1}$ being then negative, of about −6 degrees.

Conversely, if we consider the second pinion 12, which is subjected to the common action of the rack 2 and of the steering wheel 3, and which benefits thus from a steering wheel torque $C_V$ which is tends to maneuver the steering in the same direction as the assist motor 1, then the elasticity of the connection L2 between the rack 2 and said second pinion 12 allows said second pinion 12 to "catch up" for a part of its "delay" relative to the ideal theoretical position, given by the position θ1 of the drive shaft.

In practice, the correction $\delta\theta_{L2}$ to be made to the position θ2 of the rack in order to obtain the position θ12 of the second pinion 12 herein will be then positively counted.

In an equivalent manner, this amounts to consider that the rack 2 is "in delay" relative to the second pinion 12 which maneuvers it.

Herein, in the aforementioned example, the position of the second pinion 12 will be then of about +150 degrees (compared to +146 degrees of the rack).

In any case, and as it has already been mentioned hereinabove, it will be noted that the method in accordance with the invention allows obtaining a very accurate and relatively exact evaluation of the instantaneous positions of the different members (the rack 2 and the second pinion 12, in this example) from the knowledge of the effective position of a single reference member (herein the drive shaft 1, in this example), as evidenced by the proximity which exists, in FIG. 6, between the <<calculated>> position curve of the considered member and the <<measured>> effective position curve (noted by a simultaneous verification on a test bench).

In this case, it will be noted that the maximum absolute error between the calculated position according to the invention and the actual position of each member 2, 12, that is to say, the maximum deviation between <<calculated>> curve and <<measured>> curve, remains lower than 1.5 degree, or even 1 (one) degree.

Herein there is, over the entire kinematic chain of the steering mechanism 4, an accuracy level substantially equal to that of the angular sensor used to define the position of the reference member (herein the drive shaft 1).

It is then noted that, by taking into account the elastic deformations in the calculations for determining the respective positions of the members of the steering mechanism 4, the invention advantageously allows effectively compensating the errors which affected said calculations so far.

According to a preferred variant, the first member 1 being formed by the shaft of a steering assist motor M, during the stress measuring step (c), a stress value C1 which is representative of the assist torque (or motor torque) $C_M$ output by the motor, is collected.

Preferably, said stress value C1 is collected either by measuring the torque exerted by the shaft 1 of the assist motor M, for example by means of a torque sensor of the magnetostrictive type, or by measuring the assist setpoint applied to said motor M.

In practice, the measurement of the assist setpoint applied to the motor may comprise reading (in the data managed by the calculator controlling the power steering) or in measuring the intensity of the electrical current supplied to said motor M at the considered instant, this intensity being indeed representative of the motor torque $C_M$ output by said motor.

As stated hereinabove, this stress value C1, $C_M$ will preferably allow evaluating the angular position deflection $\delta\theta_{L1}$ corresponding to the elastic deformation of the first connection L1.

It will advantageously be noted that the information concerning the motor torque $C_M$ is generally already available on the on-board network controlling the steering, so as its use for the purposes of the invention requires no particular layout of the steering.

According to a preferred embodiment, as mentioned hereinabove and illustrated in FIG. 1, the steering mechanism 4 is a double-pinion mechanism which comprises an assist motor M whose shaft 1 forms the first movable member and engages, by a first connection L1 including a first pinion 11, a steering rack 2 which is slidably mounted in a steering casing and which forms the second movable member, as well as a steering wheel 3, forming a third movable member which engages the rack 2 by a second connection L2 comprising a second pinion 12.

According to this variant, during the reference position acquisition step (a), the instantaneous angular position θ1 of the shaft 1 of the assist motor, and, during the stress measuring step (c), may be measured, on the one hand the assist torque (motor torque) $C_M$ provided by the assist motor and, on the other hand the steering wheel torque $C_V$ manually exerted by the driver on the steering wheel 3, so as to be able to determine the angular position θ3 of the steering wheel 3, and/or respectively the angular position θ12 of the second pinion 12, by calculating successively, as shown in FIG. 3, the position of the rack θ2 from the angular position θ1 of the shaft 1 of the assist motor, taking into account the deformation $\delta\theta_{L1}$ of the first connection L1 under the effect of the motor torque $C_M$, then the angular position θ3 of the steering wheel, respectively that θ12 of the second pinion, relative to the position θ2 of the rack, taking into account the deformation $\delta\theta_{L2}$ of the second connection L2 (taken from the second abacus $A_{L2}$) under the combined effect of the assist torque $C_M$ and of the steering wheel torque $C_V$ (that is to say, in this case under the effect of the stress value C2 corresponding to the algebraic sum $C2=C_M+C_V$).

Herein, there is a good step by step position calculation illustration, during which are successively calculated the respective contributions to the shift of the different links of the kinematic chain composed by the members and the intermediate connections which separate the reference member (first member 1) from the target member whose position is desired to be known (herein the third member 3, 12).

According to a preferred variant of implementation of the method, the abacus or abaci $A_{L1}$, $A_{L2}$ are changed according to the wear condition of the steering mechanism 4, for example depending on the mileage of the vehicle.

Such update, performed for example during periodic reviews of the vehicle, allows in particular to take into account the effects of wear, among which the gradual emergence of clearances and the reduction of the frictions in the connections, which modify the elastic behavior, and more particularly the stiffness of the considered connection (or the considered section of kinematic chain), and consequently the plot of the applicable abacus.

The invention concerns, of course per se, a calculator and/or data medium readable by a calculator, which contains computer program code elements allowing the implementation of a method according to the invention.

As such, it will be noted that the invention may be implemented by catching up on vehicles already on the road, by simply reprogramming (including the storage of abaci) of their power steering calculator.

The invention finally concerns per se a motor vehicle, and more particularly a motor vehicle with drive wheels and with steered wheels intended in particular for transporting people, which comprises a power steering mechanism 4 which is equipped with a calculator according to the invention and/or which is controlled by a position determining method according to the invention.

Of course, the invention is in no way limited to the sole described variants, those skilled in the art being in particular able to isolate or freely combine therebetween either characteristics mentioned hereinabove, or to substitute equivalents thereto.

In particular, it is perfectly possible to adapt the method to the calculation of the position of the pinion 12 and/or of the rack 2 from the knowledge of the position of the steering wheel θ3, or that of the shaft of the motor θ1, within a steering mechanism including a single pinion 12, and whose assist motor M engages the steering column 5, between the steering wheel 3 and said pinion 12.

In such case, the abacus may in particular express the deformation of the (unique) connection L2 between the motor M and the rack 2, through the pinion 12, depending on the motor torque $C_M$ or on a combination of the motor torque $C_M$ and of the steering wheel torque $C_V$.

The invention claimed is:

1. A method for determining a position of a movable steering member belonging to a vehicle steering mechanism which comprises at least a first movable member, as well as a second movable member, separate from the first movable member, which cooperate with each other through at least a first connection allowing a force and movement transmission between the first movable member and the second movable member, said method comprising a reference position acquisition step, during which an instantaneous position of the first movable member is measured relative to a predetermined origin, then a conversion step during which an instantaneous position of the second movable member is calculated from the instantaneous position of the first movable member, said method comprising a stress measuring step, during which a stress value representative of an instantaneous force transmitted between the first movable member and the second movable member through the first connection is collected, then a correction step during which the conversion step is adapted depending on said stress value, in order to take into account, in calculating the instantaneous position of the second movable member, a position shift of the second movable member relative to the first movable member which results from an elastic deformation of the first connection under the effect of the force transmitted by the latter, wherein, during the correction step, a correction component representative of a position shift corresponding to the elastic deformation of said first connection under said stress value is associated with the stress value, according to a predetermined elasticity abacus, representative of an elastic behavior of the first connection, and in that the elasticity abacus is changed according to a wear condition of the steering mechanism.

2. The method according to claim 1, wherein the elasticity abacus is changed depending on a mileage of the vehicle.

3. The method according to claim 1, wherein the conversion step comprises a theoretical conversion sub-step, during which a theoretical position component of the second movable member is calculated by multiplying the instantaneous position of the first movable member by a theoretical transmission ratio of the first connection, fictitiously considered as non-deformable, then a resetting sub-step during which the correction component from the correction step is added to the theoretical position component of the second movable member in order to obtain an effective position of the second movable member.

4. The method according to claim 1, wherein during the correction step, there are taken into account behavior laws of the first connection in elastic deformation under stress which are different according to whether the stress value increases over time or decreases over time.

5. The method according to claim 1, wherein the first movable member is formed by the shaft of the steering assist motor, and wherein, during the reference position acquisition step, an instantaneous angular position of said shaft is measured.

6. The method according to claim 1, wherein the first movable member is formed by the shaft of the steering assist motor, and wherein, during the stress measuring step, the stress value which is representative of an assist torque output by the motor is collected.

7. The method according to claim 1, wherein the second movable member is formed by a steering rack slidably mounted in a steering casing, and on which the first movable member meshes with a pinion.

8. The method according to claim 1, wherein the steering mechanism is a double pinion mechanism which comprises the assist motor whose shaft forms the first movable member and engages, by the first connection including a first pinion, the steering rack which is slidably mounted in a steering casing and which forms the second movable member, as well as a steering wheel, forming a third movable member which engages the rack by a second connection comprising a second pinion, and in that, during the reference position acquisition step, the instantaneous angular position of the shaft of the assist motor is measured, and, during the stress measuring step, are measured, on the one hand the assist torque provided by the assist motor, and on the other hand a steering wheel torque manually exerted by the driver on the steering wheel, so as to be able to determine an angular position of the steering wheel, and/or respectively an angular position of the second pinion, by calculating successively the position of the rack from the angular position of the shaft of the assist motor, taking into account the deformation of the first connection under the effect of the motor torque, then the angular position of the steering wheel, respectively that of the second pinion, relative to the position of the rack, taking into account the deformation of the second connection under the combined effect of the assist torque and the steering wheel torque.

9. A calculator, or data medium readable by a calculator, containing computer program code elements allowing to implement a method according to claim 1.

10. A motor vehicle comprising a power steering mechanism which is controlled by a position determining method according to claim 1, and/or which is equipped with a calculator, or data medium readable by a calculator, containing computer program code elements allowing to implement the position determining method.

11. The method according to claim 1, wherein the instantaneous angular position of said shaft is measured by means of a position sensor integrated in said motor.

12. The method according to claim 1, wherein the stress value, which is representative of the assist torque output by the motor, is collected by measuring the torque exerted by the shaft of the motor, or by measuring an assist setpoint applied to said motor.

* * * * *